US012656270B2

(12) United States Patent
Tomiyama et al.

(10) Patent No.: US 12,656,270 B2
(45) Date of Patent: Jun. 16, 2026

(54) SURFACE INSPECTION DEVICE

(71) Applicant: Hitachi High-Tech Corporation, Tokyo (JP)

(72) Inventors: Ayumi Tomiyama, Tokyo (JP); Masaya Yamamoto, Tokyo (JP); Katsuhiko Kimura, Tokyo (JP); Yoshihiro Satou, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 114 days.

(21) Appl. No.: 18/718,684

(22) PCT Filed: Dec. 16, 2021

(86) PCT No.: PCT/JP2021/046458
§ 371 (c)(1),
(2) Date: Jun. 11, 2024

(87) PCT Pub. No.: WO2023/112243
PCT Pub. Date: Jun. 22, 2023

(65) Prior Publication Data
US 2025/0044240 A1      Feb. 6, 2025

(51) Int. Cl.
*G01N 21/95*        (2006.01)
*G01N 21/47*        (2006.01)

(52) U.S. Cl.
CPC ..... *G01N 21/9501* (2013.01); *G01N 21/4738* (2013.01); *G01N 2201/021* (2013.01)

(58) Field of Classification Search
CPC .......... G01N 21/9501; G01N 21/4738; G01N 2201/021; G01N 21/956
See application file for complete search history.

(56) References Cited

U.S. PATENT DOCUMENTS

2004/0223144 A1    11/2004   Traber
2009/0187354 A1     7/2009   Ooyama et al.
(Continued)

FOREIGN PATENT DOCUMENTS

JP        62-238445  A     10/1987
JP        63-82390   A      4/1988
(Continued)

OTHER PUBLICATIONS

English Translation of JP-2003028974-A Description (Year: 2003).*
(Continued)

*Primary Examiner* — Tarifur R Chowdhury
*Assistant Examiner* — Akbar H. Rizvi
(74) *Attorney, Agent, or Firm* — Crowell & Moring LLP

(57)                ABSTRACT
Provided is a surface inspection device including a sample-driving unit that stably holds a sample irrespective of a rotation angle and that can precisely control the position of the sample relative to vertical-direction driving. The sample-driving unit has a support member that holds the sample and that can displace a sample-holding unit in the vertical direction, and a sample drive source that generates drive force for driving the sample. Based on the in-plane position and vertical-direction position of the sample as sensed by a displacement sensor while a spindle shaft is rotating, a controller calculates a different vertical-direction adjustment amount for each in-plane position of the sample and drives the sample by a first adjustment amount in the vertical direction by using a vertical driving stage. The sample-driving unit drives the sample in the vertical direction by a second adjustment amount smaller than the first adjustment amount.

9 Claims, 8 Drawing Sheets

(56)            References Cited

U.S. PATENT DOCUMENTS

| | | | |
|---|---|---|---|
| 2012/0287425 A1* | 11/2012 | Ooyama ........... | H01L 21/68721 |
| | | | 356/244 |
| 2013/0010290 A1* | 1/2013 | Takahashi .......... | G01N 21/9501 |
| | | | 356/237.4 |
| 2013/0148113 A1* | 6/2013 | Oku ....................... | G01N 21/88 |
| | | | 356/237.2 |
| 2020/0341389 A1* | 10/2020 | Ito ....................... | G03F 7/70716 |

FOREIGN PATENT DOCUMENTS

| | | | | |
|---|---|---|---|---|
| JP | 63-213810 | A | | 9/1988 |
| JP | 2003028974 | A | * | 1/2003 |
| JP | 2011-119320 | A | | 6/2011 |
| JP | 2013-137315 | A | | 7/2013 |

OTHER PUBLICATIONS

International Preliminary Report on Patentability (PCT/IB/338 &
PCT/IB/373) issued in PCT Application No. PCT/JP2021/046458
dated Jun. 27, 2024, including English translation of document C2
(Japanese-language Written Opinion (PCT/ISA/237), filed on Jun.
11, 2024) (7 pages).
International Search Report (PCT/ISA/210) issued in PCT Appli-
cation No. PCT/JP2021/046458 dated Mar. 1, 2022 with English
translation (5 pages).
Japanese-language Written Opinion (PCT/ISA/237) issued in PCT
Application No. PCT/JP2021/046458 dated Mar. 1, 2022 with
English translation (9 pages).

* cited by examiner

SURFACE INSPECTION DEVICE 1

OPTICAL SYSTEM 100

DETECTION OPTICAL SYSTEM 9

ILLUMINATION OPTICAL SYSTEM 8

DISPLACEMENT SENSOR 10

SAMPLE (WAFER) 2

SAMPLE-HOLDING UNIT 3

SAMPLE-DRIVING UNIT 4

VERTICAL DRIVING STAGE 6

SPINDLE STAGE 5

ROTARY ENCODER 15

HORIZONTAL DRIVING STAGE 7

LINEAR ENCODER 16

STAGE SYSTEM 200

ROTATION AXIS 11

12

DATA PROCESSING UNIT

13

CONTROLLER

STAGE CONTROL UNIT

14

EXAMPLE OF CASE IN WHICH SAMPLE 2
VIBRATES DUE TO ROTATION

EXAMPLE WHEN SAMPLE 2 ITSELF IS WARPED

EXAMPLE OF VARIATION IN THICKNESS OF SAMPLE 2

1

SURFACE INSPECTION DEVICE

TECHNICAL FIELD

The present invention relates to a surface inspection device for inspecting a sample such as a wafer.

BACKGROUND ART

In a semiconductor manufacturing process, defects and foreign substances of a sample such as a wafer have a large influence on a yield. Therefore, it is important to perform defect inspection of a sample by a surface inspection device and feedback a result to the semiconductor manufacturing process and a manufacturing apparatus in yield control. With a progress of miniaturization of semiconductor devices, surface inspection devices are required to have improved detection performance of foreign substances and defects.

The surface inspection device irradiates a surface of a sample with laser light and moves the sample in a radial direction while rotating the sample to inspect an entire surface of the sample. When a foreign substance or a defect on the sample surface is irradiated with laser light, the laser light scatters. A detection optical system detects the scattering laser light, so as to detect the foreign substance or the defect and specify a position of the foreign substance or the defect on the sample based on a rotation angle and a position of the sample in the radial direction.

Inspection sensitivity of such a surface inspection device is improved by shortening a wavelength of laser light to be emitted. However, when the wavelength of the laser light is shortened, it is necessary to improve an S/N ratio, and thus it is necessary to change to an image detection optical system. In a case of the image detection optical system, a focal depth becomes shallow, and there is a concern that a position of the sample surface may be slightly moved to deviate out of a focal position of the detection optical system, and the inspection sensitivity may be lowered.

In order to solve this problem, PTL 1 discloses an example of a device that can perform driving in a direction perpendicular to a surface of a sample. The driving device disclosed in PTL 1 can perform driving in an upper-lower direction (Z direction), a horizontal direction (XY direction), and a rotation direction around an axis perpendicular to an XY plane. In the technique disclosed in PTL 1, a PZT stack and a lever system allow a chuck to be adjusted in the Z direction on an order of μm, so that it is possible to adjust a wafer within a range of a probe beam.

CITATION LIST

Patent Literature

PTL 1: US2004/0223144A1

SUMMARY OF INVENTION

Technical Problem

In the semiconductor manufacturing process, improvement in the inspection sensitivity and throughput is required for a surface inspection device. On the other hand, performance is further improved by shortening a wavelength of laser light, improving a maximum rotation speed, performing an inspection during acceleration and deceleration of a rotation speed, and the like.

However, when the wavelength of the laser light is shortened, it is necessary to improve an S/N ratio, and thus it is necessary to change to an image detection optical system. In a case of the image detection optical system, a focal depth becomes shallow, and there is a concern that a position of the sample surface may be slightly moved to deviate out of a focal position of a detection optical system, and the inspection sensitivity may be lowered.

Therefore, a positional accuracy of the sample surface in the vertical direction is required. In the surface inspection device, vibration of the sample surface due to rotation, warpage of the sample itself, a variation in thickness, and the like influence the positional accuracy, and deformation of a sample-holding unit due to a centrifugal force occurs. There is a difference between a height of a position of a center of gravity of the sample-holding unit and a height of a position where the sample-holding unit is fixed, and the centrifugal force acts on the sample-holding unit, resulting in deformation of the sample-holding unit in a direction in which the height of the center of gravity coincides with the height of the position where the sample-holding unit is fixed.

In addition, due to the acceleration and deceleration of the rotation speed during the inspection, a magnitude of the centrifugal force acting on the sample-holding unit also changes with the acceleration and deceleration of the rotation. This causes a change in an amount of the deformation of the sample-holding unit during the inspection.

Accordingly, it is difficult to make the position of the sample surface in the vertical direction to fall within the focal depth of the detection optical system, and a decrease in the inspection sensitivity can be expected. Therefore, it is necessary to achieve both high speed rotation of the sample and adjustment of an inspection surface of the sample at the focal position of the detection optical system with high accuracy during the high speed rotation.

In the method disclosed in PTL 1, a height of the chuck on which the wafer is mounted in the vertical direction can be adjusted by controlling the PZT stack and the lever system, but there is no description concerning adjustment for each in-plane position of the wafer.

In order to solve this problem, it is required to detect an adjustment amount in the vertical direction different for each in-plane position during the rotation of the sample and perform adjustment, so that the inspection surface of the sample is maintained at the focal position of the optical system even when the rotation speed changes during the inspection.

An object of the invention is to provide a surface inspection device including a sample-driving unit that stably holds a sample irrespective of a rotation speed when the sample is held and inspected at high speed rotation and that can control a position of the sample relative to driving in a vertical direction with high accuracy.

Solution to Problem

In order to achieve the above object, the invention is formed as follows.

A surface inspection device includes: an illumination optical system configured to irradiate a sample with laser light; a detection optical system configured to detect the laser light scattered or reflected from the sample; a stage system configured to hold the sample; a controller configured to perform drive control of the stage system; a stage control unit configured to control the stage system; and a data processing unit configured to generate scan information of the sample. The stage system includes a sample-holding unit configured to hold the sample, a sample-driving unit configured to drive the sample and the sample-holding unit, a spindle stage configured to rotate the sample, a vertical driving stage configured to drive the sample in a vertical direction, a horizontal driving stage configured to drive the sample in a horizontal direction, and a displacement sensor configured to detect a height of the sample, the sample-driving unit includes a support member configured to displace the sample-holding unit supporting the sample in the vertical direction, and a sample drive source configured to generate a drive force for driving the sample, and during rotation of the spindle stage, the controller calculates an adjustment amount in the vertical direction different for each in-plane position of the sample based on the in-plane position and a position of the sample in the vertical direction detected by the displacement sensor, and drives the sample in the vertical direction by a first adjustment amount by the vertical driving stage, and the sample driving unit drives the sample in the vertical direction by a second adjustment amount smaller than the first adjustment amount.

Advantageous Effects of Invention

According to the invention, it is possible to provide a surface inspection device including a sample-driving unit that stably holds a sample irrespective of a rotation speed when the sample is held and inspected at high speed rotation and that can control a position of the sample relative to driving in a vertical direction with high accuracy.

DESCRIPTION OF EMBODIMENTS

Hereinafter, embodiments of the invention will be described with reference to the accompanying drawings.

EMBODIMENTS

Embodiment 1

Figure 1:
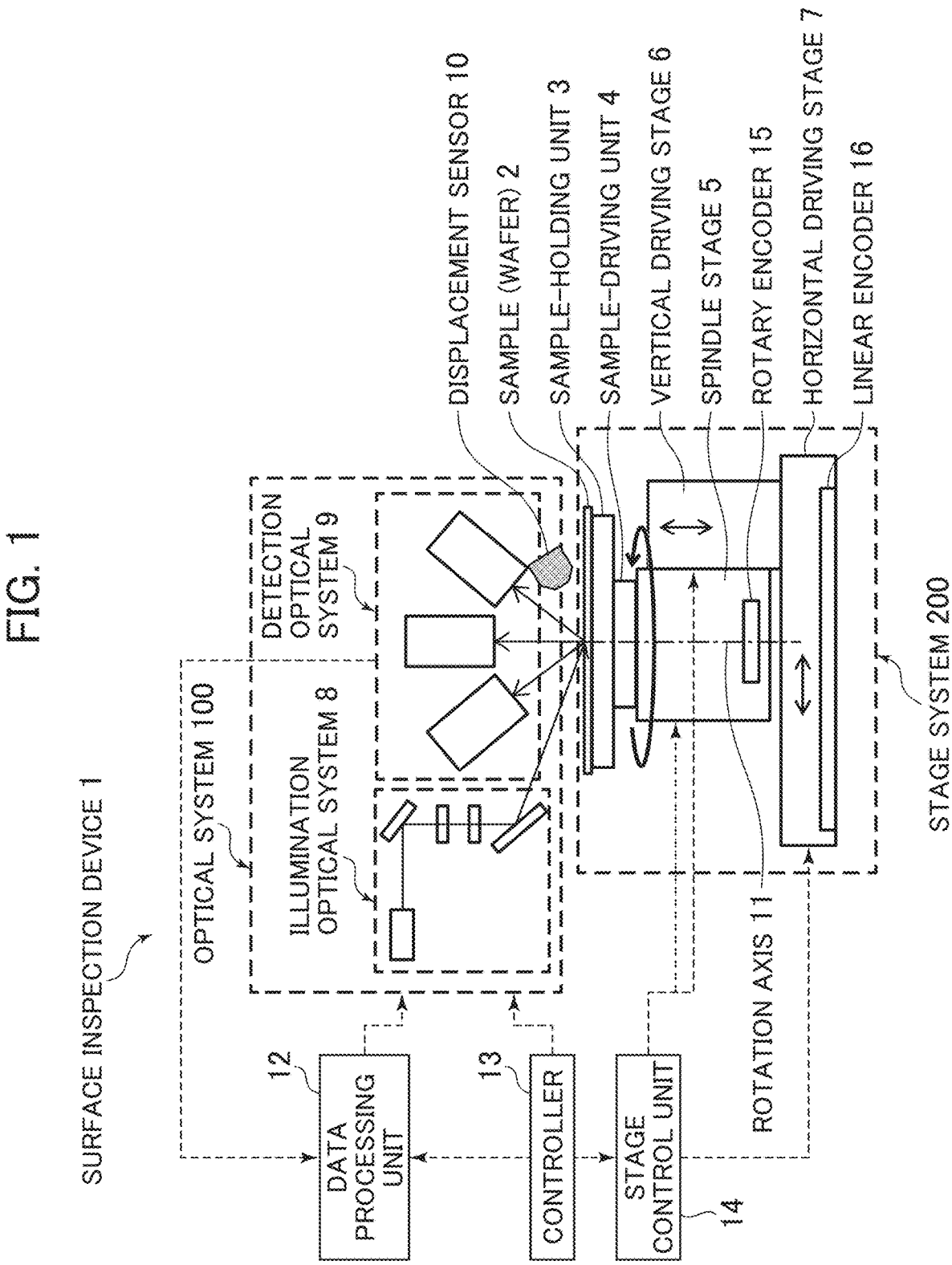
FIG. 1 is a diagram showing a surface inspection device according to Embodiment 1.

FIG. 1 is a diagram showing a surface inspection device 1 according to Embodiment 1 of the invention. The surface inspection device 1 includes an optical system 100, a stage system 200, a data processing unit 12, a controller 13, and a stage control unit 14.

The optical system 100 includes an illumination optical system 8 and a detection optical system 9, and the stage system 200 includes a horizontal driving stage 7, a vertical driving stage 6, a spindle stage 5, a sample-holding unit 3, and a sample-driving unit 4. In FIG. 1, an upper-lower direction is referred to as a vertical direction, and a left-right direction is referred to as a radial direction. Each element constituting the surface inspection device 1 will be sequentially described.

(A) Stage System 200

The stage system 200 includes the horizontal driving stage 7, the vertical driving stage 6, the spindle stage 5, the sample-holding unit 3, the sample-driving unit 4, a rotary encoder 15, and a linear encoder 16.

The sample-holding unit 3 is an inspection table that horizontally holds a sample 2 such as a wafer. Although a configuration of the sample-holding unit 3 will be described later, the sample-holding unit 3 according to Embodiment 1 holds the sample 2 by adsorbing a back surface of the sample (wafer) 2.

The surface inspection device 1 is provided with a displacement sensor 10 for detecting a height of the sample 2 held by the sample-holding unit 3. The displacement sensor 10 may be a non-contact displacement sensor in an optical or ultrasonic manner.

The sample-driving unit 4 supports and drives the sample-holding unit 3 in a vertical direction. Details of the sample-driving unit 4 will be described later.

The spindle stage 5 holds the sample-driving unit 4 and rotates about a rotation axis 11 in FIG. 1 to rotate the sample-driving unit 4, the sample-holding unit 3, and the sample 2. An optically readable rotary encoder 15 is incorporated in the spindle stage 5, a rotation angle of the spindle stage 5 is detected by the rotary encoder 15 and output to the controller 13. A rotation angle detector can be adopted instead of the rotary encoder 15 as long as the rotation angle detector is a sensor capable of accurately detecting the rotation angle.

The vertical driving stage 6 is a stage that supports the spindle stage 5, and moves the sample 2 in the vertical direction by a first adjustment amount (50 μm to 100 μm), so that a position of a surface of the sample 2 falls within a predetermined height range. Since the spindle stage 5 is supported, a speed at which the vertical driving stage 6 can be driven in the vertical direction becomes a lower speed as compared with a rotation speed of the spindle stage 5. In order to perform the inspection on the sample 2 with high accuracy, it is required to track and adjust a position variation of the surface of the sample 2 in the vertical direction during the rotation of the spindle stage 5.

The horizontal driving stage 7 supports the vertical driving stage 6, and moves the vertical driving stage 6 to move the spindle stage 5, the sample-driving unit 4, the sample-holding unit 3, and the sample 2 in the radial direction, thereby driving the sample 2 in a horizontal direction. A position of the horizontal driving stage 7 in the radial direction is detected by the linear encoder 16 and output to the controller 13. A detector for the position of the horizontal driving stage 7 in the radial direction is not limited to the linear encoder 16, and any sensor can be adopted instead of the linear encoder 16 as long as the sensor can detect a position on a straight line with high accuracy.

By operating the horizontal driving stage 7 while rotating the spindle stage 5, the entire surface of the sample 2 can be spirally inspected. In-plane position coordinates of the sample 2 can be specified based on the rotation angle of the spindle stage 5 and the position of the horizontal driving stage 7 in the radial direction.

Figure 2:
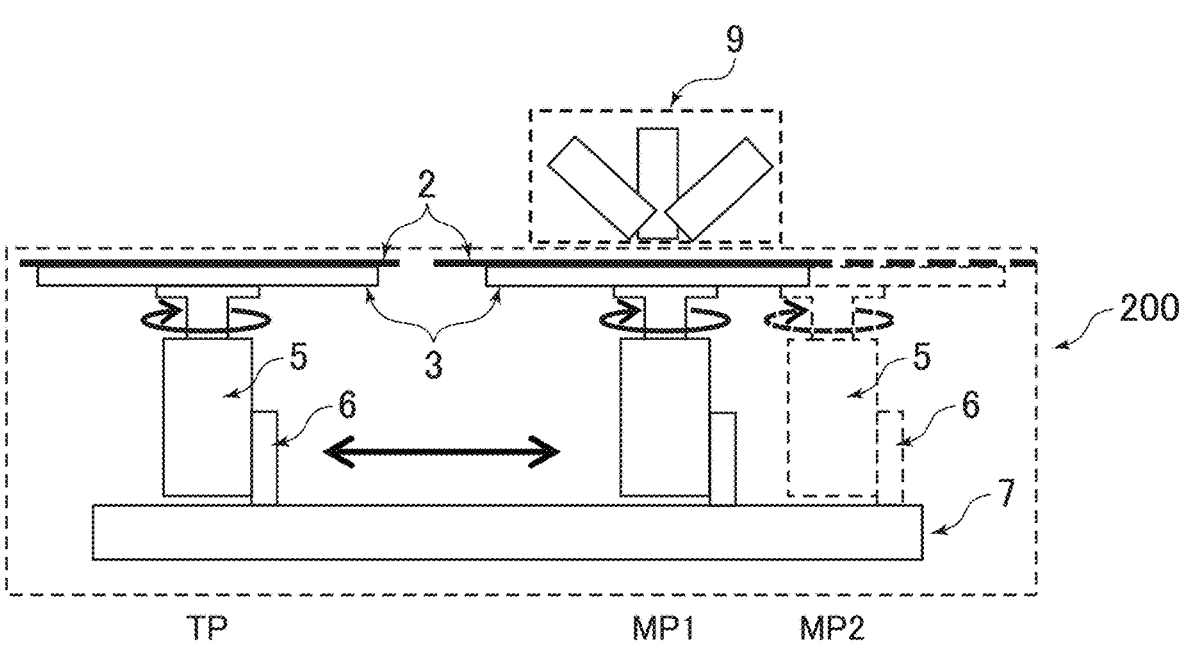
FIG. 2 is a diagram showing a sample transfer position (TP), an inspection start position (MP1), and an inspection completion position (MP2).

In Embodiment 1, as shown in FIG. 2, a sample transfer position (TP), an inspection start position (MP1), and an inspection completion position (MP2) are set on an operation shaft of the horizontal driving stage 7, and by driving the horizontal driving stage 7, the vertical driving stage 6 moves along a straight line including these positions. The inspection start position (MP1) is a position where the inspection of the sample 2 is started by irradiating the sample 2 with laser light. In Embodiment 1, the inspection start position is a position where a focal position of the laser light and a specific point (center O in Embodiment 1) of the sample 2 coincide with each other.

The inspection completion position (MP2) is a position where the inspection of the sample 2 is completed, and in Embodiment 1, is a position where an outer edge of the sample 2 coincides with the focal position of the laser light. The sample transfer position (TP) is a position at which the movement of the sample 2 to the inspection start position (MP1) is started, and in Embodiment 1, also serves as a position where the sample 2 is attached to and detached from the sample-holding unit 3.

(B) Optical System 100

The optical system 100 includes the illumination optical system 8 and the detection optical system 9.

The illumination optical system 8 is a unit that irradiates the sample 2 with laser light. The detection optical system 9 is a unit that detects laser light scattered or reflected by the sample 2. The data processing unit 12 is connected to the detection optical system 9.

(C) Data Processing Unit 12

The data processing unit 12 generates scan information of the sample 2 from a detection result obtained by the detection optical system 9 and the in-plane position coordinates of the sample 2 received from the controller 13. The scan information generated by the data processing unit 12 includes positions, magnitudes, shapes, and the like of foreign substances and defects.

(D) Stage Control Unit 14

The stage control unit 14 controls operations of the stage system 200. For example, a motor driver for driving a driving device (motor) of the spindle stage 5, a motor driver for driving a driving device (motor) of the horizontal driving stage 7, and the like are included. When a command value for the operations of the stage system 200 is received from the controller 13, a driving device is driven by the stage control unit 14 in accordance with a command from the controller 13, and the spindle stage 5 and the horizontal driving stage 7 are operated.

(E) Controller 13

The controller 13 is a computer that controls the operations of the stage system 200 (the sample-driving unit 4, the spindle stage 5, the vertical driving stage 6, the horizontal driving stage 7, the displacement sensor 10, the rotary encoder 15 incorporated in the spindle stage 5, and the linear encoder 16 incorporated in the horizontal driving stage 7) and the optical system 100 (the illumination optical system 8 and the detection optical system 9).

(F) Sample-Holding Unit 3

Figure 3:
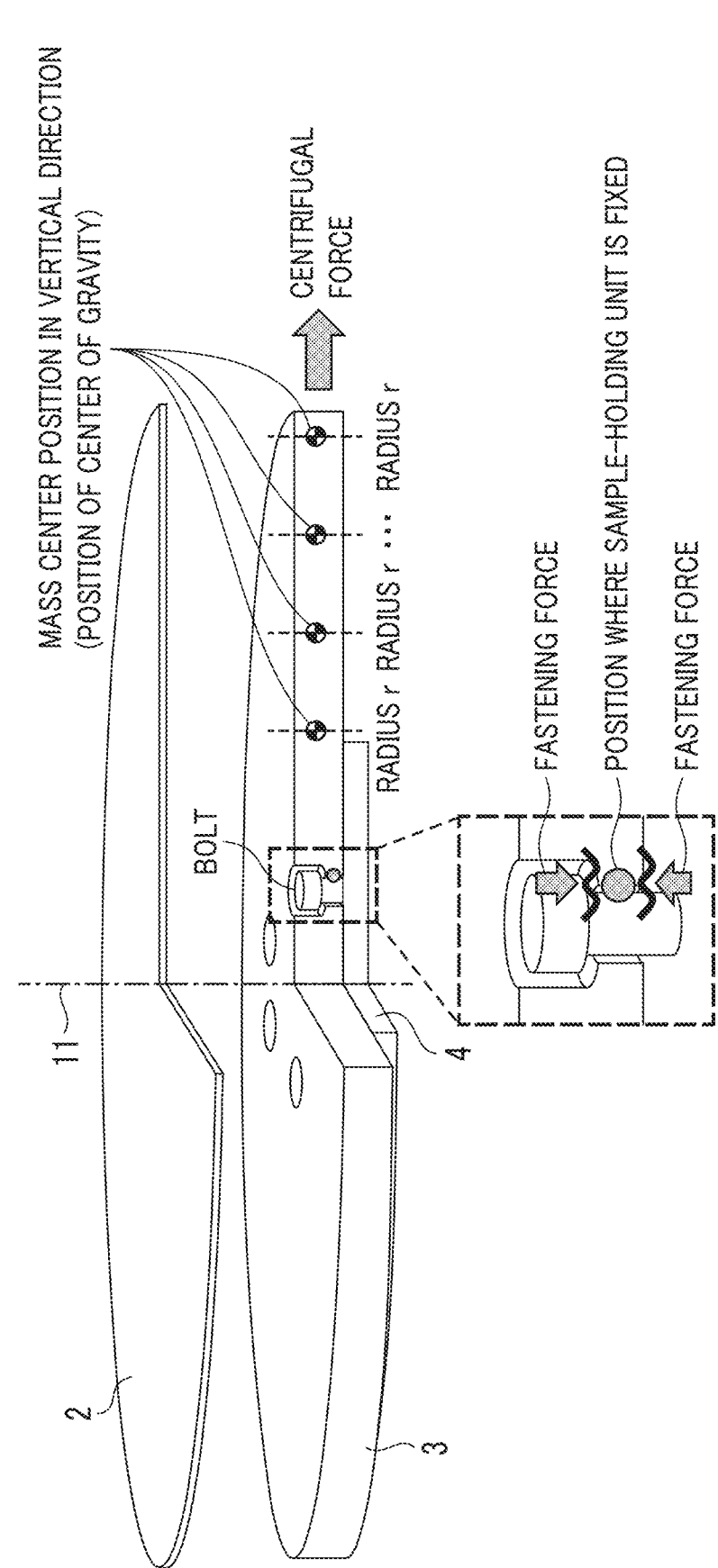
FIG. 3 is a cross-sectional view taken along a center axis of a sample-holding unit.

FIG. 3 is a cross-sectional view taken along a center axis of the sample-holding unit 3.

The sample-holding unit 3 is circular, and the center axis thereof coincides with the rotation axis 11 of the spindle stage 5. The sample-holding unit 3 is fixed to the sample-driving unit 4 by bolts. In order to adsorb and hold the sample 2 on an upper surface of the sample-holding unit 3, the sample-holding unit 3 includes a counterbore portion of the bolt in the upper surface, so that the bolt and the sample 2 do not interfere with each other. In the sample-holding unit 3, fastening forces are generated by the bolt between the counterbore portion and a surface in contact with the sample-driving unit 4. A position where the fastening forces are generated is defined as a fixing portion. On the cross section passing through the rotation axis 11, a mass center position in the vertical direction at each radial position r is defined as a center of gravity. When the sample-holding unit 3 has a shape as shown in FIG. 3, a height of the fixing portion is lower than a height of a position of the center of gravity. When a centrifugal force acts, deformation of the sample-holding unit 3 may occur in a direction in which the height of the center of gravity coincides with a height of a position where the sample-holding unit 3 is fixed. In contrast, the deformation of the sample-holding unit 3 can be prevented regardless of a magnitude of the centrifugal force by aligning the fixing portion of the sample-holding unit 3 and the height of the position of the center of gravity horizontally. The horizontal alignment of the fixing portion of the sample-holding unit 3 and the height of the position of the center of gravity can cope with a case where a rotation speed of the spindle stage 5 is increased or a case where acceleration and deceleration are performed during the inspection in order to improve an inspection speed.

(G) Sample-Driving Unit 4

Figure 4:
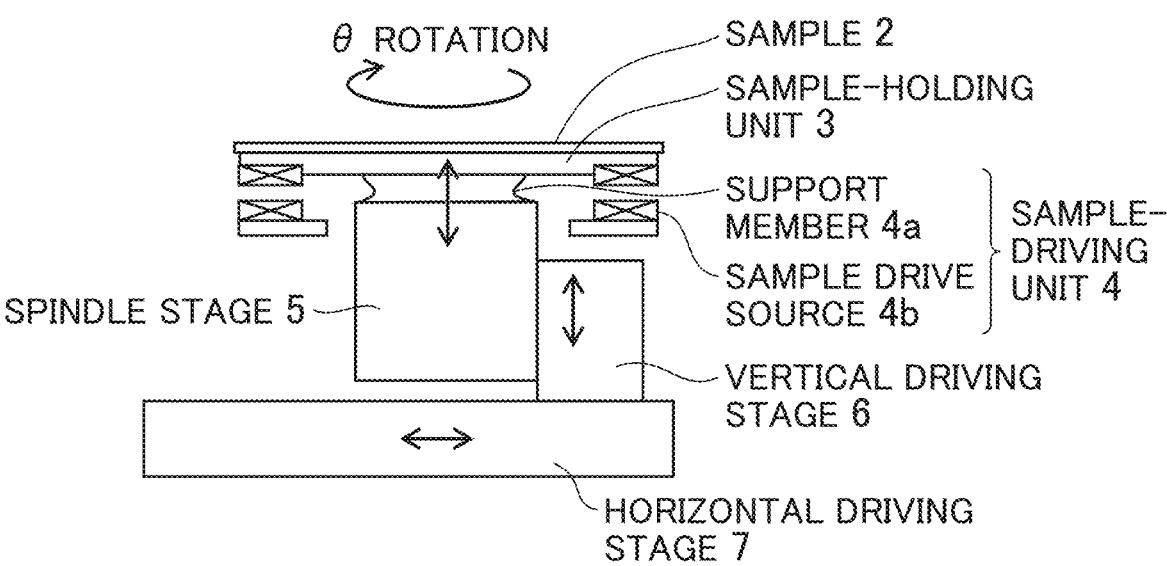
FIG. 4 is a diagram showing a configuration of a stage system according to Embodiment 1.

The sample-driving unit 4 will be described. The configuration of the stage system according to Embodiment 1 is shown in FIG. 4. In FIG. 4, the sample-driving unit 4 includes a support member 4a and a sample drive source 4b, and performs driving in the vertical direction. Since the sample-driving unit 4 only drives the sample-holding unit 3 and the sample 2, the sample-driving unit 4 can perform the driving at a higher speed as compared with the vertical driving stage 6 which includes the spindle stage 5 and performs driving. The support member 4a displaceable in the vertical direction is disposed (provided) between the sample-holding unit 3 and the spindle stage 5. The support member 4a can be made of, for example, an elastic member such as a spring, and when the support member 4a is made of a plate spring, the support member 4a may have a shape having one bent portion, a curved shape, a shape bent a plurality of times, or the like, and is not limited to a predetermined shape.

Further, with respect to the arrangement of the support members 4a, by disposing the support members 4a at equal intervals on a circumference at equal distances from the rotation axis (center axis) 11 of the sample-holding unit 3, attachment positions of the support members 4a are symmetrical with respect to the rotation axis (center axis) 11, so that an influence of variations in the attachment positions of the support members 4a can be reduced.

In addition, the sample 2 can be prevented from being inclined by providing three or more support members 4a.

Figure 5:
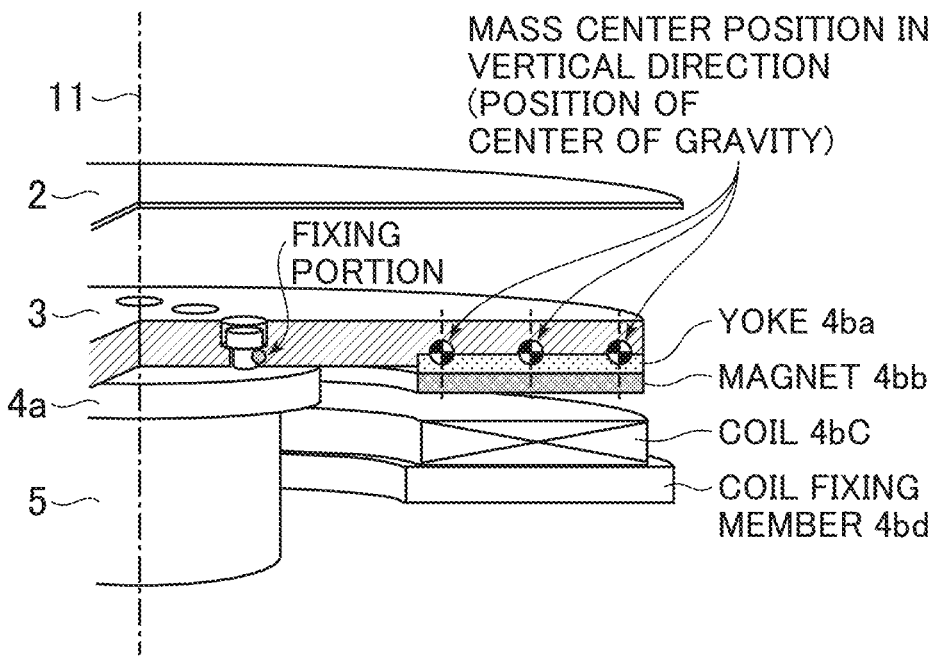
FIG. 5 is a cross-sectional view taken along the center axis of the sample-holding unit.

As shown in FIG. 5, the sample drive source 4b includes a yoke 4ba, a magnet 4bb, a coil 4bc, and a coil fixing member 4bd. The yoke 4ba and the magnet 4bb are attached to the sample-holding unit 3 such that the position of the center of gravity and the fixing portion (the fixing portion of the sample-holding unit 3) are horizontally aligned on the cross section passing through the center, and the positions thereof are at the same height as each other. It is desirable to dispose the position of the center of gravity of the sample-holding unit 3 and the position of the fixing portion at the same height on any cross section passing through the rotation axis (center axis) 11 by disposing the yoke 4*ba* and the magnet 4*bb* close to a circular ring.

By forming the yoke 4*ba* and the magnet 4*bb* in a shape close to a circular ring, it is possible to prevent turbulence of an air flow when the yoke 4*ba* and the magnet 4*bb* are rotated by the spindle stage 5 and to reduce vibration and noise. The coil fixing member 4*bd* is attached to a frame of the surface inspection device 1, and the coil 4*bc* is attached to the coil fixing member 4*bd* so as to face the magnet 4*bb*. The sample drive source 4*b* drives the sample-driving unit 4 in the vertical direction by an electromagnetic force generated by an action of a current to the coil 4*bc* and a magnetic field of the magnet 4*bb*, and also drives the sample 2 in the vertical direction. Accordingly, the surface of the sample 2 is adjusted in a range of a focal distance of the detection optical system 9.

The support member 4*a* is rotated by the rotation of the spindle stage 5, so that the sample-holding unit 3 and the yoke 4*ba* and the magnet 4*bb* fixed thereto are rotated. The sample-driving unit 4 can perform the driving at a high frequency capable of tracking a rotation frequency of the spindle stage 5 with an accuracy of about 0.5 μm to several μm with respect to a deviation of about 50 μm to 100 μm.

The vertical driving stage 6 moves the sample 2 in the vertical direction by a first adjustment amount (50 μm to 100 μm) in the vertical direction, and the sample-driving unit 4 moves (finely moves) the sample 2 by a second adjustment amount (0.5 μm to several μm) smaller than the first adjustment amount.

Accordingly, position control in the vertical direction can be accurately performed by coping with a variation during one rotation by the fine movement of the sample-driving unit 4 and coping with a large variation and an inclination in the radial direction by the vertical driving stage 6. In the movement adjustment of the sample 2 in the vertical direction, fine adjustment can be performed by an adjustment amount with an accuracy of about 0.5 μm to several μm by the sample-driving unit 4*b* with respect to a deviation adjustment amount of about 50 μm to 100 μm by the vertical driving stage 6.

(H) Inspection Operation

Figure 6:
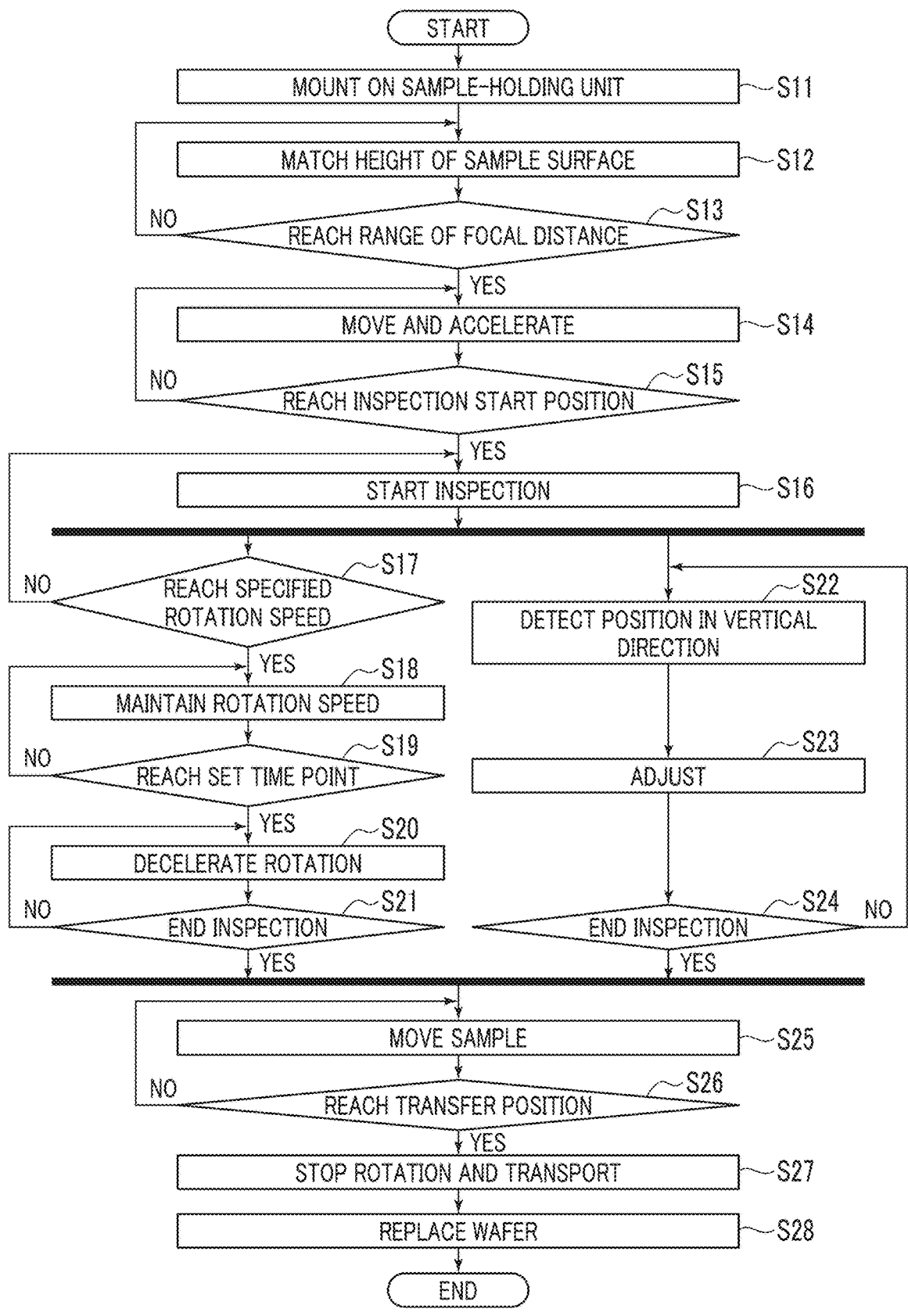
FIG. 6 is a flowchart showing an example of a control procedure of an optical system and a stage system during inspection.

FIG. 6 is a flowchart showing an example of a control procedure of the optical system 100 and the stage system 200 during the inspection by the controller 13. In the following procedure, steps S11 to S16 are a sample transfer procedure, steps S17 to S24 are an inspection procedure, and steps S25 to S28 are a sample unloading procedure.

In step S11 of FIG. 6, the sample is mounted on the sample-holding unit 3 at the sample transfer position (TP).

Next, in step S12, at the sample transfer position (TP), an average position of the surface of the sample 2 in the vertical direction is detected by an outer periphery detection/AF (Auto Focus) sensor, and the controller 13 drives the vertical driving stage 6, so that the position of the surface of the sample 2 in the vertical direction falls within a focal range of the detection optical system 9.

In step S13, the controller 13 determines whether the position of the surface of the sample 2 in the vertical direction reaches the focal range of the detection optical system 9, and if the position of the surface of the sample 2 in the vertical direction falls within the range, the process proceeds to step S14.

In step S14, the controller 13 drives the horizontal driving stage 7 and the spindle stage 5 to start the movement to the inspection start position (MP1) and acceleration of the rotation.

In step S15, when the movement of the sample 2 is started, the controller 13 determines whether the sample 2 arrives at the inspection start position (MP1). At this time, the acceleration of the spindle stage 5 continues.

In step S16, when the sample 2 reaches the inspection start position (MP1), the inspection is started. The illumination optical system 8 irradiates a center position of the surface of the sample 2 with laser light. By the horizontal driving stage 7 moving the sample 2 from the inspection start position (MP1) to the inspection completion position (MP2) while accelerating the rotation of the spindle stage 5, the laser light spirally irradiates the sample 2 from the center of the sample 2 to inspect the entire surface of the sample 2. Thereafter, an inspection result is obtained based on the scan information.

In step S17, the controller 13 determines whether the spindle stage 5 reaches a predetermined rotation speed, and the spindle stage 5 continues to accelerate until the rotation speed reaches the predetermined rotation speed.

In step S18, when the spindle stage 5 reaches a specified rotation speed, the specified rotation speed is maintained.

In step S19, the controller 13 determines whether a set time point is reached. The set time point is a time point earlier by a required stop time required for stopping the rotation of the spindle stage 5 at the specified rotation speed by back-calculating from a specified time point when the sample 2 arrives at the sample transfer position (TP) from the inspection completion position (MP2) after the inspection is completed. The required stop time is a known value, and for example, a design value or an experimental value can be used.

In step S20, when the set time point is reached, the controller 13 starts to decelerate the rotation of the spindle stage 5 while continuing the inspection.

In step S21, when the reduction of the rotation speed of the spindle stage 5 is started, the controller 13 proceeds to the determination of an end of the inspection. The end of the inspection is determined by whether the inspection is completed after the sample 2 reaches the inspection completion position (MP2) (whether the outer edge of the sample 2 coincides with the focal position of the laser light in Embodiment 1).

(I) Flow of Height Adjustment of Sample Surface

During the inspection, steps S22 to S24 for adjusting the sample height are performed in parallel with steps S17 to S21.

In step S22, simultaneously with the calculation of the in-plane position coordinates of the sample 2 by the rotary encoder 15 and the linear encoder 16, the position of the surface of the sample 2 in the vertical direction is detected by the displacement sensor 10.

In step S23, based on the calculated in-plane position coordinates of the sample and the detected position of the sample surface in the vertical direction, the sample-driving unit 4 and the vertical driving stage 6 perform driving and adjust the position of the surface of the sample 2 in the vertical direction within the range of the focal depth of the detection optical system 9. At this time, when the detected position of the surface of the sample 2 in the vertical direction is a deviation amount that cannot be adjusted by the sample-driving unit 4, the position adjustment is further performed by the vertical driving stage 6. The position variation of the sample 2 in the vertical direction includes an averaged position variation in the radial direction and a fine position variation generated at a high speed in a circumferential direction. The position variation in the vertical direction averaged in the radial direction is adjusted by the vertical driving stage 6, and the fine position variation in the vertical direction at a high speed in the circumferential direction due to the rotation is adjusted by the sample-driving unit 4.

In step S24, steps S22 and S23 are repeated until the inspection is completed, and when the inspection is completed, the operation of detecting and adjusting the position of the surface of the sample 2 in the vertical direction is also ended.

In step S25, when the inspection is completed, the controller 13 moves the sample 2 to the sample transfer position (TP) by the horizontal driving stage 7. At this time, the spindle stage 5 continues to decelerate.

In step S26, the controller 13 proceeds to the determination of the arrival at the transfer position. Whether the sample 2 reaches the sample transfer position (TP) is determined, and the movement of the sample 2 and the deceleration of the spindle stage 5 are continued until the sample 2 reaches the sample transfer position (TP).

In step S27, when the sample 2 reaches the transfer position, the spindle stage 5 and the horizontal driving stage 7 are stopped.

In step S28, when the rotation of the spindle stage 5 and the driving of the horizontal driving stage 7 are stopped, the process proceeds to replacement of the sample 2, and the above processes are repeated.

In Embodiment 1, as in steps S17 to S21, the rotation speed is accelerated, maintained, and decelerated during the inspection. As described in the matter (F) of the sample-holding unit 3, by aligning the fixing portion and the height of the center of gravity of the sample-holding unit 3, the deformation of the sample-holding unit 3 itself is prevented, and flatness of the sample 2 is maintained.

Even in a case where the rotation speed does not change, the position variation of the sample surface in the vertical direction due to the rotation occurs by an influence of a variation in a thickness of the sample 2 itself, a rotation accuracy of the spindle stage 5, the flatness of the sample-holding unit 3, and the like. In this case, the flow of adjusting the position in the vertical direction is effective.

As described above, according to the embodiment of the invention, the position variation of the sample 2 in the vertical direction averaged in the radial direction is adjusted by the vertical driving stage 6, and the fine position variation in the vertical direction at a high speed in the circumferential direction due to the rotation is adjusted (finely adjusted) by the sample-driving unit 4, and thus it is possible to provide the surface inspection device 1 including the sample-driving unit 4 capable of stably holding the sample 2 regardless of the rotation speed when the sample 2 is held and inspected at high speed rotation, and controlling the position of the sample 2 with high accuracy with respect to the driving in the vertical direction.

Embodiment 2

Next, the surface inspection device 1 according to Embodiment 2 of the invention will be described with reference to FIG. 7.

The surface inspection device 1 according to Embodiment 2 is different from the surface inspection device 1 according to Embodiment 1 in the arrangement of the sample-driving unit 4, and other configurations are the same as those of the surface inspection device 1 according to Embodiment 1. Since the entire configuration of the surface inspection device 1 is the same as the configuration shown in FIG. 1, the illustration and detailed description thereof will be omitted.

Figure 7:
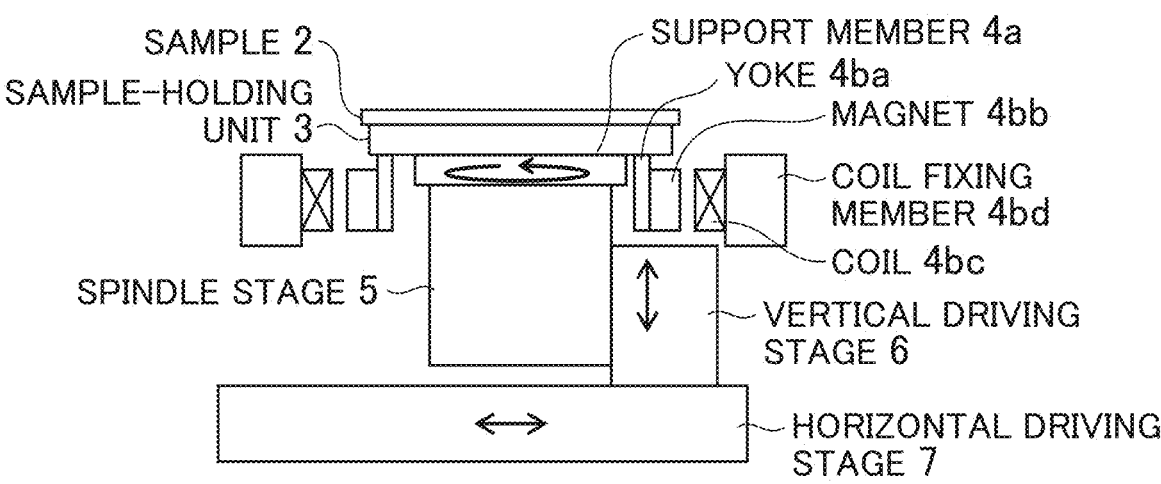
FIG. 7 is a diagram showing a configuration of a stage system according to Embodiment 2.

In FIG. 7, the support member 4a displaceable in the vertical direction is disposed between the spindle stage 5 and the sample-holding unit 3. The yoke 4ba is fixed to the sample-holding unit 3, and the magnet 4bb is attached to the yoke 4a. The yoke 4ba has a tubular shape and is provided outside the spindle stage 5 as shown in FIG. 7. The magnet 4bb is provided outside the yoke 4ba along the yoke 4ba. The coil fixing member 4bd is attached to a structure (frame) of the surface inspection device 1, and the coil 4bc is attached to the coil fixing member 4bd so as to face the magnet 4bb. The sample 2 is driven in the vertical direction by the electromagnetic force generated by the action of the current to the coil 4bc and the magnetic field of the magnet 4bb.

Also in Embodiment 2, the same effect as in Embodiment 1 can be obtained.

Embodiment 3

Next, the surface inspection device 1 according to Embodiment 3 of the invention will be described with reference to FIG. 8.

The surface inspection device 1 according to Embodiment 3 is different from the surface inspection device 1 according to Embodiment 1 in the driving method of the sample-driving unit 4 and the support member 4a, and other configurations are the same as those of the surface inspection device 1 according to Embodiment 1. Since the entire configuration of the surface inspection device 1 is the same as the configuration shown in FIG. 1, the illustration and detailed description thereof will be omitted.

Figure 8:
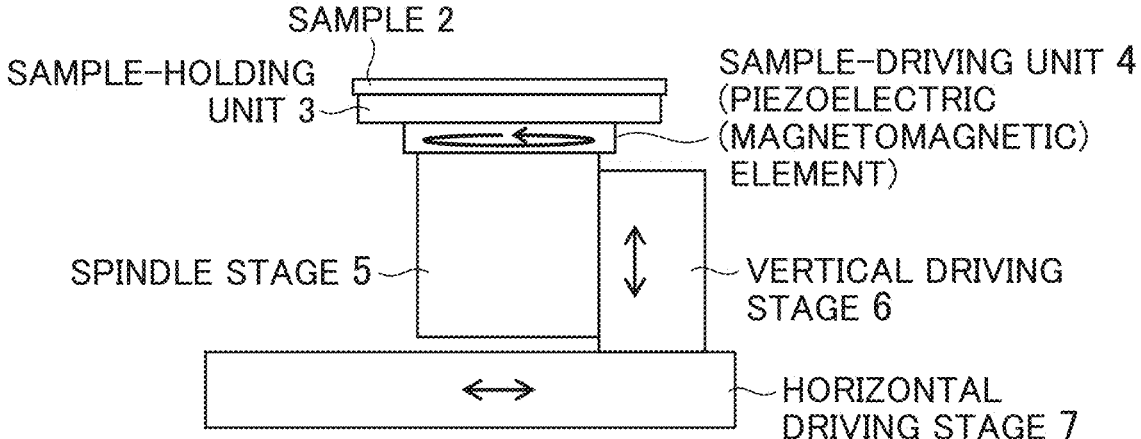
FIG. 8 is a diagram showing a configuration of a stage system according to Embodiment 3.

In FIG. 8, the sample drive source 4b includes a mechanism for generating an electromagnetic force or a member for generating an electric-magnetic force such as a piezoelectric element or a magnetostrictive actuator, and the sample-driving unit 4 is disposed between the spindle stage 5 and the sample-holding unit 3. Accordingly, the sample 2 is driven in the vertical direction. The sample-driving unit 4b is not limited to the piezoelectric element or the magnetostrictive actuator, and may be any unit as long as the unit can perform the adjustment at a high frequency in a manner of tracking a rotation frequency with an accuracy of about 0.5 μm to several tens of μm. The sample drive source 4b generates at least one of an electric-magnetic force to generate a drive force for driving the sample 2.

Also in Embodiment 3, the same effect as in Embodiment 1 can be obtained.

Embodiment 4

Next, the surface inspection device 1 according to Embodiment 4 of the invention will be described.

The sample-holding unit 3 according to Embodiment 1 of the invention holds the sample 2 in the manner of adsorbing the back surface of the sample 2, but the sample 2 can be held in other manners such as a manner of gripping an edge of the sample 2 so as to make the back surface of the sample 2 to be in a floating state.

The manner of adsorbing and holding the back surface of the sample 2 in Embodiment 1 is used in a case of, for example, being used by a semiconductor device manufacturer.

The manner of holding the sample 2 by making the back surface of the sample 2 to be in the floating state, which is described in Embodiment 4, is used in a case of, for example, being used in a wafer manufacturer who is not allowed to bring the back surface of the sample 2 into contact with the sample-holding unit 3.

The surface inspection device 1 according to Embodiment 4 is different from the surface inspection device 1 according to Embodiment 1 in that the sample-holding unit 3 holds a side surface of the sample 2, and other configurations are the same as those of the surface inspection device 1 according to Embodiment 1. Since the entire configuration of the surface inspection device 1 is the same as the configuration shown in FIG. 1, the illustration and detailed description thereof will be omitted.

In Embodiment 4, a side surface of the sample 2 is supported by the sample-holding unit 3 without contacting the back surface of the sample 2, and the sample-holding unit 3 is driven by, for example, the sample-driving unit 4 according to Embodiment 2. In this case, the sample-driving unit 4 supports the holding unit 3 without contacting the back surface of the sample 2.

In Embodiment 4, the same effect as that of Embodiment 1 can be obtained, and in addition, it is possible to provide the surface inspection device 1 including the sample-driving unit 4 capable of performing the position control with high accuracy with respect to the driving of the sample 2 in the vertical direction even when the back surface of the sample 2 is not allowed to come into contact with the sample-holding unit 3.

According to the invention described above, the sample-holding unit 3 can prevent deformation of the sample 2 regardless of the rotation speed by aligning the fixing portion and the height of the position of the center of gravity.

Accordingly, the flatness of the sample 2 can be maintained not only in coping with a higher rotation speed but also when the rotation speed changes during the inspection.

Figure 9A:
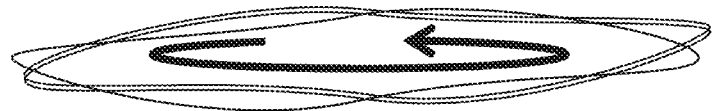
FIG. 9A is a diagram showing a case where a sample vibrates by rotation.
Figure 9B:
FIG. 9B is a diagram showing a state where the sample itself is warped.
Figure 9C:
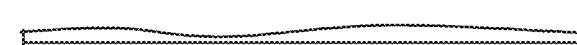
FIG. 9C is a diagram showing a state where the sample itself has a variation in thickness.

However, in addition to the deformation of the sample-holding unit 3, the warpage of the sample 2 itself (shown in FIG. 9B), the variation in thickness (shown in FIG. 9C), the rotation accuracy of the spindle stage 5, and the like can be cited as causes of the position variation of the surface of the sample 2 in the vertical direction (shown in FIG. 9A).

Although the vertical driving stage 6 can be adjusted to several tens of millimeters, it is difficult to cope with the position variation of the sample surface in the vertical direction at a high speed during the high speed rotation.

On the other hand, the sample-driving unit 4 can adjust the position variation of the sample surface of several μm to several tens of μm in the vertical direction by tracking the frequency of the high speed rotation. Inspection sensitivity can be further improved by combining the adjustments of the vertical driving stage 6 and the sample-driving unit 4. In addition, as compared with the case where the entire spindle stage 5 is driven by the vertical driving stage 6, the driving of only the sample-holding unit 3 and the sample 2 by the sample-driving unit 4 is lightweight, and thus an effect of preventing driving power can be expected.

In Embodiments 1 to 4, the position of the sample 2 in the vertical direction can be adjusted with high accuracy by adjusting the position variation of the surface of the sample 2 in the vertical direction by the vertical driving stage 6 by the first adjustment amount having a magnitude of several mm or less and by performing adjustment by the sample-driving unit 4b with an accuracy according to the second adjustment amount having a magnitude of about 0.5 μm to several μm with respect to a high speed variation.

In Embodiments 1 to 4, the sample-holding unit 3 has a circular shape, and the sample-driving unit 4 adjusts the second adjustment amount such that the height of the position where the sample-holding unit 3 is fixed and the height of the center of gravity at the position of the sample-holding unit 3 in the radial direction are substantially the same, so that the deformation of the sample-holding unit 2 caused by the influence of the centrifugal force due to the rotation can be prevented, and the sample 2 can be kept flat.

In Embodiments 1 to 4, only the sample-holding unit 3 and the sample 2 can be displaced in the vertical direction due to the rotation of the sample-holding unit 3 and the sample 2 by the spindle stage 5.

In addition, in Embodiments 1 to 4, while the inspection of the sample 2 is performed by the spindle stage 5, the horizontal driving stage 7, the illumination optical system 8, the detection optical system 9, the data processing unit 12, and the controller 13, a preceding position of the sample 2 in the vertical direction from an inspection position of the sample 2 which is located at an outer peripheral position of a spiral trajectory of the laser light with which the sample 2 is irradiated from the illumination optical system 8 may be detected by the displacement sensor 10, and the controller 13 and the stage control unit 14 may perform prediction control on the sample-driving unit 4 and drive the sample 2 in the vertical direction by the second adjustment amount immediately before the detected preceding position of the sample 2 is irradiated with the laser light.

With such control, the controller 13 and the stage control unit 14 can calculate the second adjustment amount, output an operation command to the sample-driving unit 4, compensate for a delay time until the sample-driving unit 4 actually drives the sample 2, and perform operation control in real time.

The controller 13 and the stage control unit 14 can calculate a difference between a position of the inspection position, on which the laser light is irradiated, of the sample 2 in the vertical direction and a position in the vertical direction at the preceding position, and correct the second adjustment amount based on the calculated difference.

REFERENCE SIGNS LIST

1 . . . surface inspection device
2 . . . sample (wafer)
3 . . . sample-holding unit
4 . . . sample-driving unit
4a . . . support member
4b . . . sample drive source
4ba . . . yoke
4bb . . . magnet
4bc . . . coil
4bd . . . coil fixing member
5 . . . spindle stage
6 . . . vertical driving stage
7 . . . horizontal driving stage
8 . . . illumination optical system
9 . . . detection optical system 10 . . . displacement sensor
11 . . . rotation axis
12 . . . data processing unit
13 . . . controller
14 . . . stage control unit
15 . . . rotary encoder
16 . . . linear encoder
100 . . . optical system
200 . . . stage system

The invention claimed is:

1. A surface inspection device comprising:

an illumination optical system configured to irradiate a sample with laser light;

a detection optical system configured to detect the laser light scattered or reflected from the sample;

a stage system configured to hold the sample;

a controller configured to perform drive control of the stage system;

a stage control unit configured to control the stage system; and a data processor configured to generate scan information of the sample, wherein the stage system includes a sample-holding table configured to hold the sample, a sample-driving unit configured to drive the sample and the sample-holding table, a spindle stage configured to rotate the sample, a vertical driving stage configured to drive the sample in a vertical direction, a horizontal driving stage configured to drive the sample in a horizontal direction, and a displacement sensor configured to detect a height of the sample, the sample-driving unit includes a support member configured to displace the sample-holding table supporting the sample in the vertical direction, and a sample drive source configured to generate a drive force for driving the sample, and during rotation of the spindle stage, the controller calculates an adjustment amount in the vertical direction different for each in-plane position of the sample based on the in-plane position and a position of the sample in the vertical direction detected by the displacement sensor, and drives the sample in the vertical direction by a first adjustment amount by the vertical driving stage, and the sample-driving unit drives the sample in the vertical direction by a second adjustment amount smaller than the first adjustment amount, wherein the sample-driving unit and the vertical driving stage have a relationship such that, during rotation of the spindle stage, when a position of a surface of the sample in the vertical direction has a deviation amount that cannot be adjusted by the sample-driving unit, position adjustment is performed by the vertical driving stage.

2. The surface inspection device according to claim 1, wherein while the sample is inspected by the spindle stage, the horizontal driving stage, the illumination optical system, the detection optical system, the data processor, and the controller, the displacement sensor continues to detect the in-plane position and the position of the sample in the vertical direction, and the sample-driving unit and the vertical driving stage continue to adjust the position in the vertical direction to cause the sample to fall within a focal range of the detection optical system.

3. The surface inspection device according to claim 1, wherein a position variation of a sample surface having a magnitude of several mm or less in the vertical direction is adjusted by the first adjustment amount by the vertical driving stage, and the adjustment is performed by the second adjustment amount by the sample-driving unit with an accuracy of about 0.5 µm to several µm with respect to a high-speed variation.

4. The surface inspection device according to claim 1, wherein the sample-holding table has a circular shape, and a height of a position where the sample-holding table is fixed to the sample-driving unit and a height of a center of gravity in the vertical direction at positions from a center portion of the sample-holding table in a radial direction to an outer peripheral portion are substantially the same.

5. The surface inspection device according to claim 1, wherein the support member is disposed between the spindle stage and the sample-holding table, and the sample-holding table and the sample are displaced in the vertical direction due to rotation of the sample-holding table and the sample by the spindle stage.

6. The surface inspection device according to claim 1, wherein the sample-driving unit includes a device configured to generate an electric-magnetic force for driving the sample and the sample-holding table, and the sample-holding table and the sample are displaced in the vertical direction due to the rotation of the sample by disposing the sample-driving unit between the spindle stage and the sample-holding table.

7. The surface inspection device according to claim 1, wherein the displacement sensor detects a preceding position of the sample in the vertical direction, from an inspection position of the sample, the preceding position being located at an outer peripheral position of a spiral trajectory of the laser light with which the sample is irradiated from the illumination optical system, and the controller and the stage control unit perform prediction control on the sample-driving unit to drive the sample in the vertical direction by the second adjustment amount immediately before the preceding position of the sample is irradiated with the laser light.

8. The surface inspection device according to claim 7, wherein the controller and the stage control unit calculate a difference between a position of the inspection position, on which the laser light is irradiated, of the sample in the vertical direction and a position in the vertical direction at the preceding position, and correct the second adjustment amount based on the calculated difference.

9. The surface inspection device according to claim 1, wherein the first adjustment amount is 50 µm to 100 µm, and the second adjustment amount is 0.5 µm to several µm.

* * * * *